March 13, 1928. 1,662,479

J. A. SMITH

TAKE-UP FOR BEARINGS

Filed Aug. 5, 1926

John A. Smith Inventor,

By C.A.Snow&Co.
Attorneys.

Patented Mar. 13, 1928.

1,662,479

UNITED STATES PATENT OFFICE.

JOHN A. SMITH, OF CANONSBURG, PENNSYLVANIA.

TAKE-UP FOR BEARINGS.

Application filed August 5, 1926. Serial No. 127,430.

This invention aims to provide novel means for taking up the wear in bearings, and more particularly in bearings which support the rolls of metal working machines. It is within the province of the disclosure to improve generally and to enhance the utility of devices of that type to which the present appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figures 1, 2:
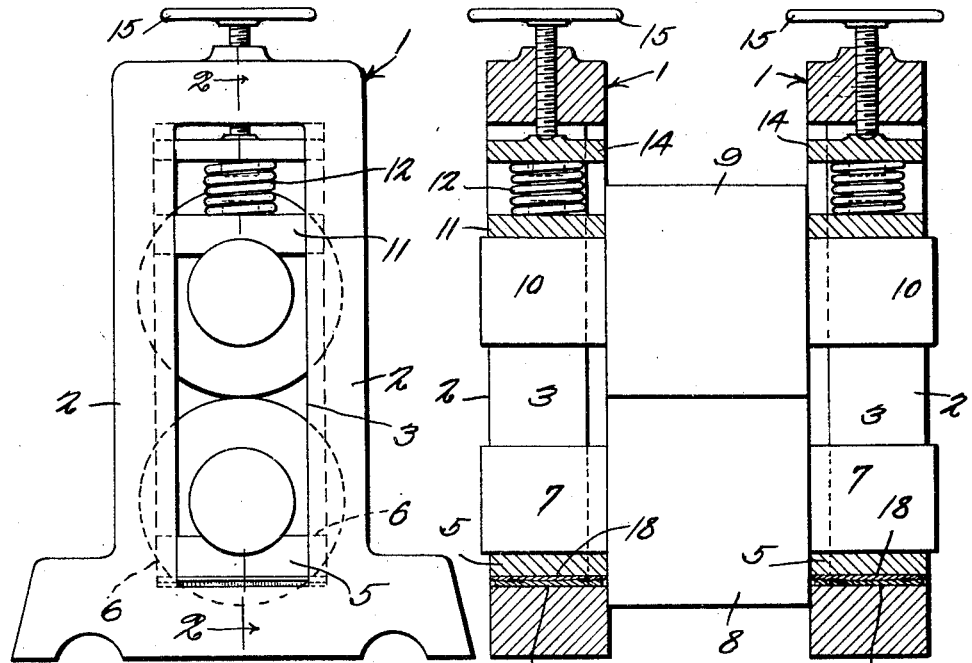
Figure 1 shows in side elevation, a rolling machine equipped with the device forming the subject matter of this application.
Figure 2 is a section taken about on the line 2—2 of Figure 1, parts remaining in elevation.

The device forming the subject matter of this application may be embodied in machines of widely different sorts, but, by way of illustration, there is shown in the drawings, a rolling machine comprising a frame 1 embodying standards 2 having longitudinal openings 3, there being guideways 4 on the inner sides of the standards 2, along the longitudinal edges of the openings 3. Bearings 5, or "brasses" are located in the openings 3 at the lower end thereof, and have extensions 6 received in the guideways 4 to prevent the bearings from moving outwardly. The trunnions 7 of a lower roller 8 are journaled on the bearings 5, and the bearings 5 are prevented from moving inwardly by engagement with the end of the roll 8. The roll 8 is in cooperation with an upper roll 9 the trunnions 10 of which are engaged by bearings 11 held down by compression springs 12 cooperating with followers 14, the followers being fed downwardly by compression screws 15 or the like, the screws being threaded into the upper end of the standards 2.

The construction above described is common, and no novelty is claimed for it, saving in so far as it may enter into patentable combinations with parts hereinafter described.

Figures 3, 4:
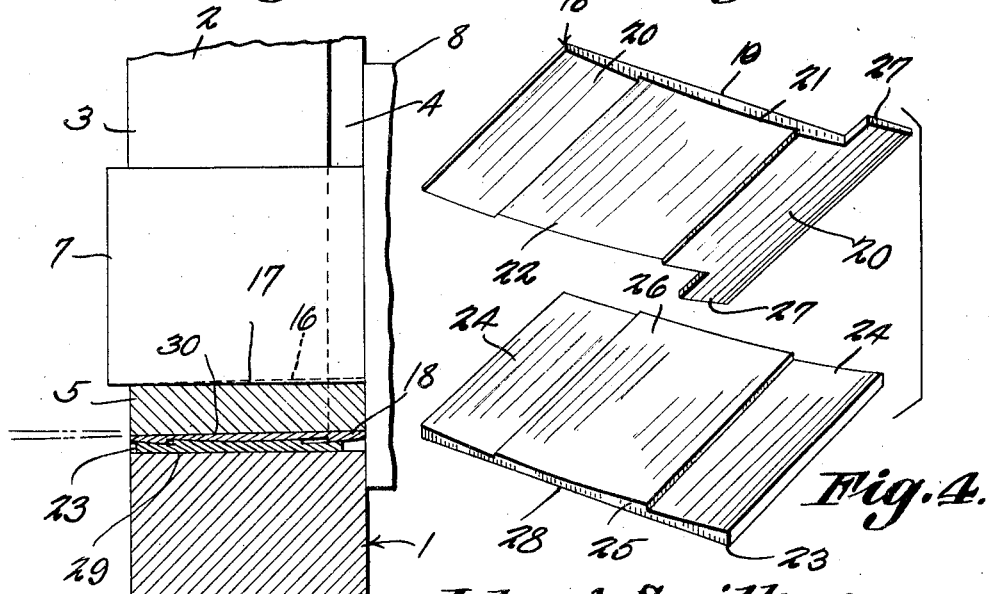
Figure 3 is a detail enlarged from Figure 2, the constituent members of the take-up having been shifted from the positions which they occupy in Figure 2.
Figure 4 is a composite perspective view showing the members of the take-up mechanism.

It happens very often that the bearings 5 do not wear evenly. Thus, the bearings 5 may wear down from the dash line 16 of Figure 3 to the solid line 17 of that figure, the bearing 5 then assuming, in section, the form of a blunted wedge. The object of this invention is to provide novel means for taking up wear of the kind last above alluded to.

In carrying out the invention, there is provided a metal member 18, in the form of a plate, the upper surface of the member 18 being flat, as shown at 19, and the member 18 being provided at its ends with convexed lower surfaces 20. In the lower surface of the plate 18 there is a recess 21 having a convexed surface 22. The surfaces 20 and 22 are concentric, and, preferably, are parts of circles having a very long radius. At one end, the member 18 has lateral projections 27. There is provided, as a part of the take-up mechanism, a member or plate 23 which is complemental to the member or plate 18. The member 23 has a flat lower surface 28. The member 23 is provided at its edges with concaved surfaces 24 and has, intermediate its ends, an upstanding rib 25 the upper surface of which is concaved as at 26. The radius of curvature of the surfaces 24 preferably is about the same as the radius of curvature of the surfaces 20, and the radius of curvature of the surface 26 is about the same as the radius of curvature of the surface shown at 22.

The flat lower surface 28 of the member 23 rests on the surface 29 of the standard 2 which exists at the lower end of the opening 3. The flat surface 19 of the member 18 rests against the lower surface 30 of the bearing 5. The rib 25 is received in the recess 21, the recess being somewhat wider than the rib, the concaved surface 26 of the rib engaging the convexed surface 22 of the recess, and the convexed surfaces 20 of the member 18 engaging the concaved surfaces 24 of the member 23. The projections 27 on the member 18 are received in the guideways 4 of the frame 1 and the member 18 cannot shift out of place horizontally, although it can have some vertical movement, and a little tilting movement with respect to the horizonal, as well.

As the bearing 5 wears away from the line shown at 17, the bearing 5 of course tilts a trifle with respect to the vertical, and the member 18 tilts accordingly. The member 18 is held against longitudinal movement to any appreciable extent, owing to the provision of the projections 27, and because the inner end of the member 18 is engaged by one end of the roll 8; but under the jar or vibration which occurs when the rolling machine is in use, the member 23 will move endwise, the concaved surfaces of the member 23 cooperating with the convexed surfaces of the member 18, to take up wear, it being recalled that when the bearing 5 is tilted vertically, as it wears away, the member 18 is tilted accordingly, and, thus, is made efficient as a means whereby the jar or vibration may be transmitted to the plate 23, to cause the plate 23 to move endwise and take up the wear, as aforesaid. Although the member 23 can move relatively to the member 18, that movement occurs within limits, defined by the amount that the rib 25 can move in the recess 21.

What is claimed is:—

A take-up for bearings, comprising a pair of superposed plate-like members, one of said members being provided on its inner surface with a recess which extends but partway through that member, the other member having a rib, received in the recess, the recess being large enough so that the rib may have limited movement therein, the said members having contacting surfaces on opposite sides of the rib and the groove, the rib and the groove having contacting surfaces, all of said surfaces on one of said members being correspondingly convexed, and all of said surfaces on the other of said members being concaved to fit upon the convexed surfaces.

In testimony that I claim the foregoing as my own, I have hereto affixed my signature.

JOHN A. SMITH.